(12) United States Patent
Maanoja

(10) Patent No.: US 7,321,775 B2
(45) Date of Patent: Jan. 22, 2008

(54) METHOD FOR OBTAINING LOCATION RELATED INFORMATION ALLOWING TO LOCATE A TERMINAL ATTACHED TO A COMMUNICATION NETWORK

(75) Inventor: Markus Maanoja, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/496,955

(22) PCT Filed: Nov. 28, 2001

(86) PCT No.: PCT/EP01/13925

§ 371 (c)(1),
(2), (4) Date: Nov. 16, 2004

(87) PCT Pub. No.: WO03/047293

PCT Pub. Date: Jun. 5, 2003

(65) Prior Publication Data

US 2005/0070296 A1 Mar. 31, 2005

(51) Int. Cl.
*H04Q 7/20* (2006.01)

(52) U.S. Cl. .............. 455/456.1; 455/456.2; 455/456.3; 455/456.4; 455/456.5; 455/456.6; 455/404.2; 342/352; 342/357.01; 342/357.02; 342/357.1

(58) Field of Classification Search .......... 455/404.2, 455/456.1, 456.3, 456.2, 456.5, 456.6, 457, 455/456.4, 414.1, 404.1; 342/352, 356, 357.01, 342/357.02, 357.1
See application file for complete search history.

(56) References Cited

U.S. PATENT DOCUMENTS 5,930,713 A * 7/1999 Nguyen ............ 455/440
6,006,096 A * 12/1999 Trompower ............ 455/456.2
6,097,959 A * 8/2000 Yost et al. ............ 455/456.2

(Continued)

FOREIGN PATENT DOCUMENTS

WO 01/52569 A1 7/2001

OTHER PUBLICATIONS

M. Lankinen, "Nokia mPosition for Legacy Phones", Nov. 15, 2001, http://www.radiolinja.fi/inenglish/mcatch/radiolinja.pdf.*
M. Lankinen, "Nokia mPosition for Legacy Phones," mpos partnered with radiolinja.PPT/19.03.2001, http://www.radiolinja.fi/inenglish/mcathc/radiolinja.pdf, from the Internet on Nov. 15, 2001.

*Primary Examiner*—Charles N. Appiah
*Assistant Examiner*—Olumide Ajibade-Akonai
(74) *Attorney, Agent, or Firm*—Squire Sanders & Dempsey L.L.P.

(57) ABSTRACT

The present invention concerns a method for obtaining location information on the location of a terminal (UE) attached to a communication network, said method comprising the steps of: issuing, by an application (LCS_CLIENT) requiring such location information, a request for location information to said communication network, forwarding said request within said network to a routing entity (VMSC, SGSN) currently in charge of routing messages for said terminal, and collecting information for determining the location of said terminal in response to said request, wherein said collecting comprises the further steps of: inquiring an access control entity (RNC) of said network currently in charge of controlling access of said terminal to said network for parameters for location determination, providing a response from said access control entity to a location determination functional entity (SMLC), judging, at said location determination functional entity (SMLC), whether the response contains said inquired parameters, and if not, asking said routing entity to provide said location determination functional entity (SMLC) with information available at said routing entity for determining the location of the terminal.

21 Claims, 2 Drawing Sheets

U.S. PATENT DOCUMENTS

| | | | |
|---|---|---|---|
| 6,104,931 A * | 8/2000 | Havinis et al. | 455/456.5 |
| 6,134,446 A * | 10/2000 | Sasuta et al. | 455/456.5 |
| 6,169,899 B1 * | 1/2001 | Havinis et al. | 455/433 |
| 6,191,737 B1 * | 2/2001 | Havinis et al. | 342/450 |
| 6,212,391 B1 * | 4/2001 | Saleh et al. | 455/456.4 |
| 6,219,557 B1 | 4/2001 | Havinis | |
| 6,275,706 B1 * | 8/2001 | Rune | 455/456.1 |
| 6,311,069 B1 | 10/2001 | Havinis et al. | |
| 6,385,458 B1 * | 5/2002 | Papadimitriou et al. | 455/456.2 |
| 6,442,392 B2 * | 8/2002 | Ruutu et al. | 455/456.1 |
| 2001/0009857 A1 * | 7/2001 | Vanttinen | 455/456 |
| 2003/0148774 A1 * | 8/2003 | Naghian et al. | 455/456 |
| 2004/0082344 A1 * | 4/2004 | Moilanen et al. | 455/456.3 |
| 2004/0102196 A1 * | 5/2004 | Weckstrom et al. | 455/456.1 |
| 2006/0030333 A1 * | 2/2006 | Ward et al. | 455/456.1 |

* cited by examiner

METHOD FOR OBTAINING LOCATION RELATED INFORMATION ALLOWING TO LOCATE A TERMINAL ATTACHED TO A COMMUNICATION NETWORK

FIELD OF THE INVENTION

The present invention relates to a method for obtaining location information on the location of a terminal attached to a communication network.

BACKGROUND OF THE INVENTION

With recent progress in communication technology, services offered by communication network operators to the subscribers thereto have also gained more attention. Among such services, so-called location based services (LCS) find considerable attention. For example, a subscriber may have subscribed to a service providing the subscriber with up-to-date traffic information via the network to his communication terminal. To this end, however, in order to provide the proper information to the subscriber, it is inevitable to know the subscriber's location within the network. Stated in other words, a subscriber currently being located in the Berlin area does not need to receive traffic information concerning the Helsinki area.

As mentioned above, the present invention is concerned to provide such location information on the location of a terminal attached to a communication network.

In this connection, it has to be noted that the present invention as subsequently described is applicable to any communication network as long as terminals may change their position within the communication network. Thus, the network may support the use of e.g. mobile terminals in the sense of wireless terminals or even some kind of "fixed" (i.e. non-wireless) terminals which may however be connected ("plugged-in") at different locations within the network. The expression terminal as used herein is intended to cover any such type of subscriber equipment. Likewise, also the communication network as such is not limited to a certain type of communication network. For purposes of describing the present invention, however, the subsequent description refers to a WCDMA (WCDMA=Wideband Code Divisional Multiple Access) radio communication network also known as 3G UMTS (3G=$3^{rd}$ generation, UMTS=Universal Mobile Telecommunication System) network. Nevertheless, other communication networks based on other or similar transmission principles are also suitable for the present invention being implemented thereto.

FIG. 1 shows a typical example of at least those parts of the communication network architecture which are involved when the present invention is implemented to the communication network. The illustrated example in FIG. 1 refers to the 3G UMTS network architecture.

As shown, a terminal also known as user equipment UE is adapted to communicate via the network. Note that for communication the user equipment UE has at least to be registered to the network in a subscriber database and attached to a communication network. "Attached" here means a state of the user equipment in which it is switched on and it is known to the network that the user equipment UE terminal is (in principle) "ready" for communication even if currently idling.

In communication, the user equipment accesses the network infrastructure via an air interface (not expressly shown).

More precisely, the terminal UE exchanges signals with a radio transceiver device referred to as Node_B (in UMTS) (corresponding to Base Station BS in GSM). Each Node_B has a certain coverage area within which communication with the Node_B is enabled. The coverage area is also referred to as a cell. Each cell is identified by at least a cell identifier. Optionally, a cell identifier CI can be supplemented by a location area identifier LAI. The entire communication network area is thus composed of a plurality of cells. The location of Node_B's is defined upon network planning. Thus, a network management/planning system functional entity has a knowledge of the network topology and also of the cell identifiers corresponding to the respective Node_B's.

A group of Node_B's are controlled by a radio network controller RNC (corresponding to base station controller BSC in GSM). Of course, although not shown in FIG. 1, more than one RNC can be present in the network depending on its size/area covered. In order to keep the illustration simple, however, only one RNC has been shown. Note that a RNC represents an access control entity of said network, which is currently in charge of controlling access of said terminal to said network.

Further, one or more RNC's are grouped for being controlled by a mobile services switching center MSC (3G-MSC) serving as a routing entity currently in charge of routing messages for said terminal. This means that the MSC switches calls/connections concerning a terminal of interest in that the MSC "selects" the proper RNC controlling the proper Node_B via which the terminal communicates. Depending on the size of the network, of course more than one MSC are present. A moving and/or roaming terminal may thus be present in the area of a MSC which may also be referred to as visited MSC VMSC.

Note that in 3G UMTS networks not only speech (as an example of real-time data) are transmitted, but also packet data (as an example on non-real-time data) are transmitted. Packet data transmission takes place via a so-called GPRS network existing "in parallel" and comprising SGSN (Serving GPRS Support Node) and GGSN (Gateway GSN) nodes. In the GPRS, the SGSN corresponds in functionality and hierarchical location within the network to the VMSC explained above.

Connected to the MSC/SGSN is on one hand a location determination functional entity SMLC which is in turn connected to a gateway entity GMLC (Gateway Mobile Location Center) and on the other hand the network planning/management system mentioned earlier above.

The GMLC has a connection to a subscriber register HLR (Home Location register) and/or HSS (Home Subscriber Server) keeping a record of subscribers having subscribed to the network and the services available to them. In addition, the GMLC provides for a gateway functionality offering a connection to the "outside" of the network, where an application (e.g. run on a computer device) is located. (The application may be associated to a service control point entity SCP of the network (not shown).)

Signaling between GMLC—SMLC and SMLC—MSC/SGSN is achieved using MAP3/SS7 (Mobile Application Part 3/Signaling System No. 7), as shown in FIG. 1.

So far, the network architecture has roughly been described in order to simplify understanding of the invention. Of course, the entities described above may perform additional functions as compared to those briefly highlighted above. However, a full description of the capabilities and interrelations there between can not be given in the framework of the present patent application. Rather, the reader is referred to the corresponding standards published by 3GPP (3$^{rd}$ Generation Partnership Project) and/or ETSI (European Telecommunication Standards Institute).

Now, when requiring location information related to a specified terminal, according to an earlier solution, a so-called CAMEL ATI request was issued from the GMLC (triggered by the application requiring the location information). (CAMEL=Customized Application for Mobile network Enhanced Logic, ATI=Any Time Interrogation). According to this procedure, the GMLC sends an ATI request to the HLR which forwards the request message as "Provide Subscriber Info" to the MSC. In the response message, cell identity CI is returned to the GMLC via HLR. This CI has to be transferred into coordinates, e.g. position calculation capability to GMLC, i.e. an operator proprietary interface between GMLC and SMLC has to be provided for.

However, an operator/manufacturer specific interface between SMLC and GMLC reduces interconnectivity of such entities if provided by different manufacturers.

In a further approach, the applicant of the present invention conceived to fetch network parameters from the base station controller BSC and/or radio network controller RNC using location based services LCS standard messages. (Note that with Camel ATI mentioned earlier above only Cell ID or SAI can be fetched from MSC/SGSN.) These parameters fetched are CI (Cell Identity) and TA (Timing Advance) and Rx-levels (received signal levels) and Service area Identity SAI (in 3G). The terminal position calculation entity provisioned in connection with the MSC and referred to as SMLC calculates the user position estimate based on these parameters.

Although this example procedure relates to 2G (2$^{nd}$ generation) functionality, it does not restrict the invention to these procedures only. When implementing a terminal position calculation function in connection to the MSC, in this concept the GMLC requests the user position from visited MSC, i.e. VMSC. The VMSC forwards the request further to the BSC which responds with Cell ID, Timing Advance and power level information (CI+TA+Rx-levels). The MSC forwards these parameters to the calculation functional entity, i.e. the SMLC entity. After position calculation, the SMLC sends the coordinate information to the GMLC which sends them further to the LCS application having requested for the location information.

In rough outline, this procedure is for example disclosed in "Nokia mPosition for Legacy Phones", by M. Lankinen, page 7, retrieved under http://www.radiolinja.fi/inenglish/mcatch/radiolinja.pdf from the Internet on Nov. 15, 2001.

Now the problem is that the BSC and/or RNC from which the parameters are requested is specifically required to be adapted to the system functionality. If the BSC/RNC has for example been manufactured by another manufacturer and/or for another network operator, it is not able to respond to the LCS request with mentioned parameters. Thus, the whole procedure would fail.

This in turn would lead to the fact that location based services would not be available in those locations in which the BSC/RNC in charge is not adapted to the above outlined implementation.

SUMMARY OF THE INVENTION

Hence, it is an object of the present invention to provide an improved method for obtaining location information on the location of a terminal attached to a communication network, which is free from above mentioned drawbacks inherent to the known solutions so far.

Accordingly, the above object is for example achieved by a method for obtaining location information on the location of a terminal attached to a communication network, said method comprising the steps of: issuing, by an application requiring such location information, a request for location information to said communication network, forwarding said request within said network to a routing entity currently in charge of routing messages for said terminal, and collecting information for determining the location of said terminal in response to said request, wherein said collecting comprises the further steps of: inquiring an access control entity of said network currently in charge of controlling access of said terminal to said network for parameters for location determination, providing a response from said access control entity to a location determination functional entity, judging, at said location determination functional entity, whether the response contains said inquired parameters, and if not, asking said routing entity to provide said location determination functional entity with information available at said routing entity for determining the location of the terminal.

Still further, according to advantageous further developments of the present invention, said inquired parameters comprise cell identity CI, timing advance TA and power level Rx information, said inquired parameters comprise SAI in 3G systems, information available at said routing entity is cell identity CI, information available at said routing entity further comprises location area LA information, it further comprises a step of determining location information on the location of said terminal based on the collected information, said location information is determined by calculation of the location using the inquired parameters, said location information is determined by mapping the available information at said routing entity to known location information of access nodes of said network, said determined location information is returned to the application having issued the request for location information.

By virtue of the present invention being implemented, a location based service LCS can be implemented which covers all access control entity areas such as BSC/RNC areas independent on the manufacturer/operator of the access control entity, while not requiring any proprietary interfaces. Also, the present invention enables a stand alone SMLC architecture connected to the core network domain with ATI support.

BRIEF DESCRIPTION OF THE DRAWINGS

The present invention will be more readily understood when read in conjunction with the accompanying drawings, in which.

DETAILED DESCRIPTION OF THE EMBODIMENTS

The present invention will subsequently be described in greater detail with reference to the drawings.

Figure 1:
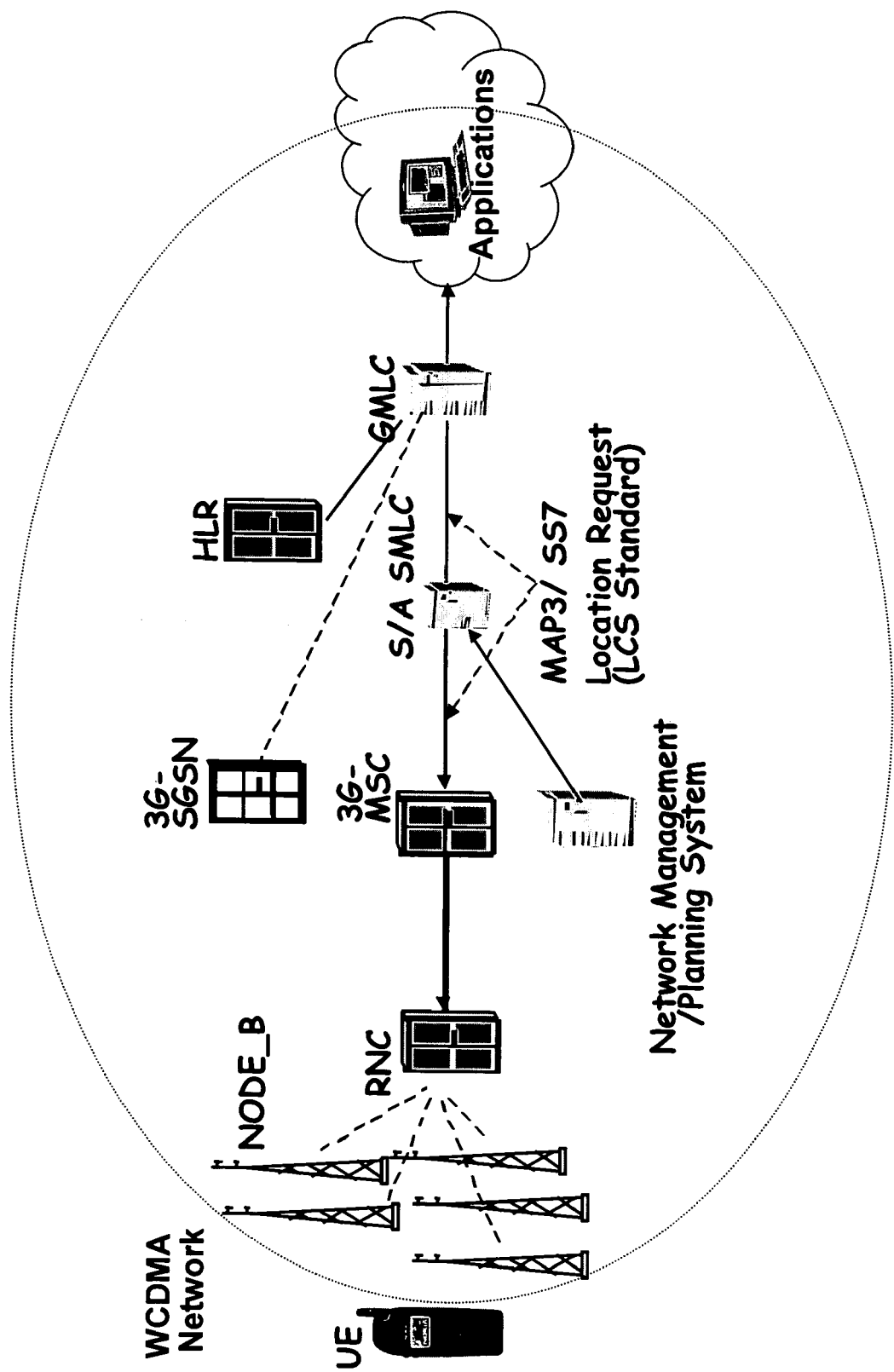
FIG. 1 shows a basic communication network architecture used for implementing the present invention.

Since FIG. 1 has already been described above, a repeated description of the example of a network architecture used for implementing the present invention is considered to be dispensable.

Figure 2:
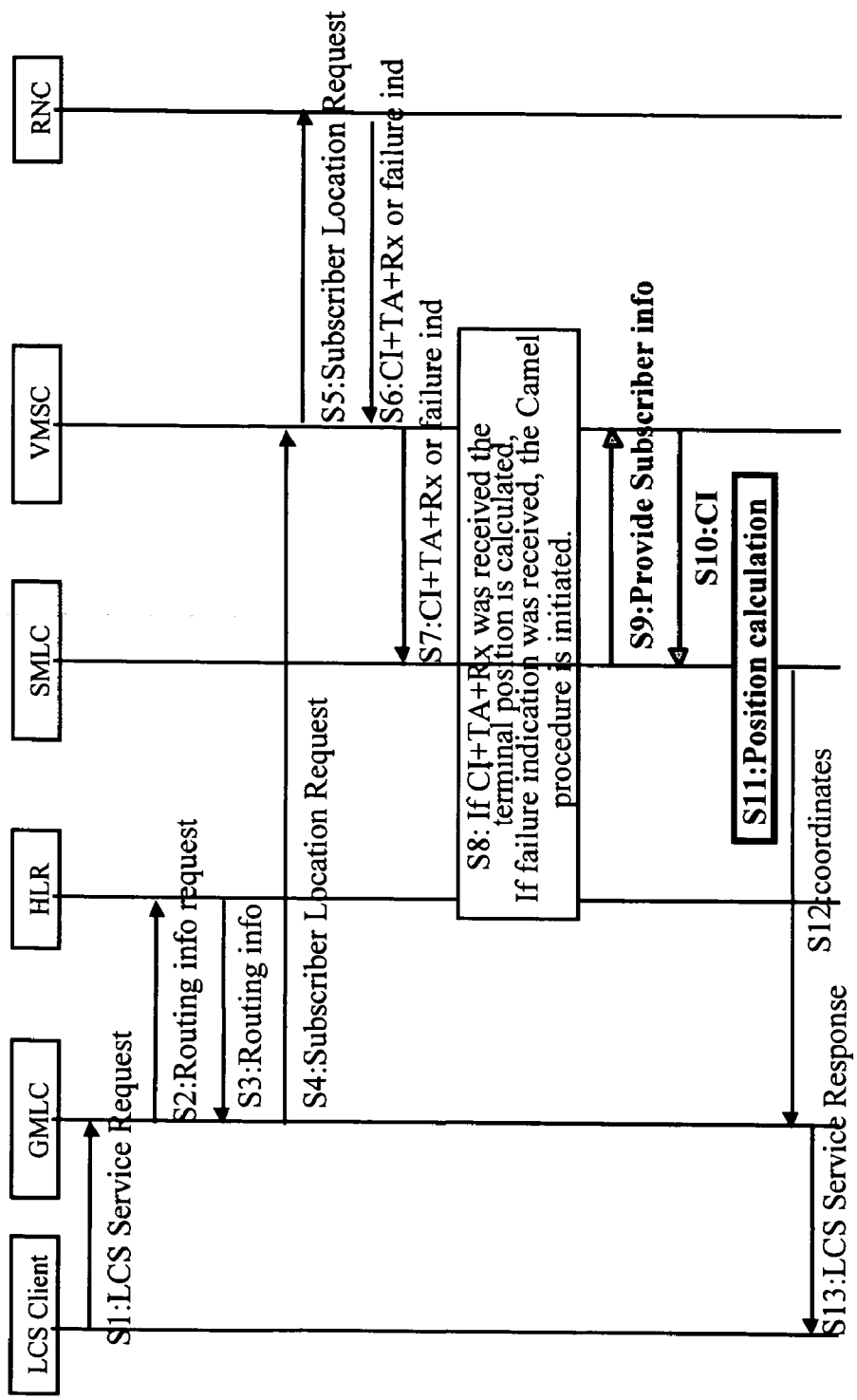
FIG. 2 shows a signaling diagram of signaling messages exchanged between network entities illustrated in FIG. 1.

FIG. 2 shows the signaling involved in connection with the invention when implemented in a communication network as for example shown in FIG. 1. Note that the network entities are illustrated arranged in horizontal direction, signaling between the entities is illustrated using arrows, and the vertical sequence of signaling arrows represents the sequence in time of the signaling.

As shown in FIG. 2, in step S1 am LCS client terminal on which a location based application is run (see FIG. 1) issues a request for location information to said communication network (LCS Service Request). This request is received by the GMLC forming part of the network. In response thereto, the GMLC in step S2 requests the HLR for routing info in a Routing Info Request. In step S3, the HLR returns the requested routing info to the GMLC.

Of course, in the request in steps S1, S2 the terminal for which location information is to be obtained has been identified, e.g. by its MSISDN (Mobile Station ISDN number) or by its IMEI (International Mobile Equipment Identifier) or any other suitable identifier for addressing a terminal such as the terminal's address (permanent or care_of address) in case of MobileIP based terminals.

From the routing information returned from the HLR in step S3 the GMLC learns which MSC and/or RNC is currently in charge of routing messages for (i.e. to/from) the terminal concerned. Note that since in theory this can be SGSN as well, more generally, the GMLC learns which "core network element" is currently in charge of routing messages for (i.e. to/from) the terminal concerned. In response to this information, in step S4, the GMLC forwards a Subscriber Location Request within said network to the routing entity, i.e. VMSC (or SGSN in case of a GPRS network/terminal concerned) currently in charge of routing messages for said terminal in order to collect information for determining the location of said terminal in response to said request. The request of step S4 is relayed by the MSC further for inquiring an access control entity RNC (or BSC) of said network currently in charge of controlling access of said terminal to said network for parameters for location determination.

In response to the request, the access control entity is expected to return CI, TA and Rx (or SAI) parameters to the MSC (VMSC or SGSN) which relays these parameters further to the SMLC entity. Thereafter, the procedure is continued at the SMLC. This means that in step S8 the SMLC evaluates the received information.

In a first case of evaluation, the expected parameters CI (Cell Identity)(or also referred to as Location Area Identifier LAI, dependent on the network type), TA (Timing Advance) and Rx levels are judged to be received. That is, the received response contains said inquired parameters. Then the procedure jumps from step S8 to step S11 and based on the received parameters the location of the terminal concerned within the network is calculated (Step S11). Steps S9 and S10 are in this case omitted. The calculated coordinates are transferred in step S12 from the SMLC to the GMLC which in turn, in step S13, returns a LCS service response to the LCS client/application.

According to the present invention, in a second case of evaluation, at least one of the expected parameters CI (LAI), TA and Rx levels is judged in step S8 to be not received or not received correctly. Note that a lack of receipt of at least one parameter may comprise also the case in which no response at all is received in step S7. This may be detected if within a predetermined configurable time period, after the request S5, no signal is forwarded from the VMSC with destination SMLC. Note further that instead of a lacking parameter or an erroneous parameter, an explicit failure indication may also be received, indicating that the RNC/BSC is not capable of providing the requested information.

Then, in the second case of evaluation, steps S9 and S10 are carried out. Steps S9 and S10 correspond to a subset of CAMEL ATI procedure being initiated by the SMLC in response to the failure indication (or other event outlined above). In practice this means that in step S9 a ,"provide Subscriber Info" message is sent from the SMLC to the MSC. (Note that the specified usage as defined in CAMEL specifications, this message is sent from HLR and sending is triggered by Camel ATI request sent from SCP to HLR.) Thus, according to the present invention, this message is sent 1) from another entity and 2) based on another trigger event as compared to existing CAMEL specification.

In step S10, the MSC responds with "Provide Subscriber Info" response message which includes the Cell ID (and/or SAI) and possibly the Location Area. It should be noted that the CI information provided in the response might not be the current one (this depends on Camel version supported by MSC). However, usually during the previous LCS procedure the MSC has paged the terminal so that the returned CI should be valid.

After receiving the CI, the SMLC in step S11 maps it to coordinate information based on a knowledge of base station antenna location. Stated in other words, the CI is compared with information on antenna locations kept in the network management/planning system. This coordinate information is, in step S12, then returned to the GMLC which in turn, in step S13, returns a LCS service response to the LCS client/application.

Note that the procedure described is used in cases when non-proprietary BSC/RNC can either not calculate terminal position autonomously or not respond with position parameters, e.g. CI, TA or Rx. However, the procedure is needed to cover all parts of the network, including those which are not capable of above mentioned actions (in connection with the first case of evaluation). The only difference between these areas will be the achieved accuracy: in pure proprietary solution (in which a BSC/RNC is provided which can respond with CI+TA+Rx parameters) accuracy is much better (location calculated based on CI+TA+Rx) than in non-proprietary areas (location calculated based on mapping of CI only).

Accordingly, as has been described above, the present invention concerns a method for obtaining location information on the location of a terminal UE attached to a communication network, said method comprising the steps of: issuing, by an application LCS_CLIENT requiring such location information, a request for location information to said communication network, forwarding said request within said network to a routing entity VMSC, SGSN currently in charge of routing messages for said terminal, and collecting information for determining the location of said terminal in response to said request, wherein said collecting comprises the further steps of: inquiring an access control entity RNC of said network currently in charge of controlling access of said terminal to said network for parameters for location determination, providing a response from said access control entity to a location determination functional entity SMLC, judging, at said location determination functional entity SMLC, whether the response contains said inquired parameters, and if not, asking said routing entity to provide said location determination functional entity SMLC with information available at said routing entity for determining the location of the terminal.

Although the present invention has been described herein above with reference to its preferred embodiments, it should be understood that numerous modifications may be made thereto without departing from the spirit and scope of the invention. It is intended that all such modifications fall within the scope of the appended claims.

The invention claimed is:

1. A method, comprising:
issuing, by an application requiring location information on the location of a terminal attached to a communication network, a request for location information to said communication network;
forwarding said request within said network to a routing entity currently in charge of routing messages for said terminal; and
collecting information to determine the location of said terminal in response to said request,
wherein said collecting comprises
inquiring an access control entity of said network currently in charge of controlling access of said terminal to said network for parameters for location determination by calculation of the location using the inquired parameters,
providing a response from said access control entity to a location determination functional entity,
judging, at said location determination functional entity, whether the response contains said inquired parameters, and
when the response does not contain said inquired parameters,
asking said routing entity to provide said location determination functional entity with information available at said routing entity for determination of the location of the terminal by mapping the provided available information to coordinate information, wherein the mapping of the provided available information of the coordinate information comprises comparing the provided available information with information on antenna locations kept in a network management/planning system and
determining location information on the location of said terminal based on the collected information,
wherein the location of the terminal is determined with higher accuracy when the inquired parameters are received as compared to being not based on the inquired parameters,
wherein the method is configured to obtain the location information.

2. The method according to claim 1, wherein the inquiring for said inquired parameters comprises inquiring for cell identity, timing advance, and power level information.

3. The method according to claim 1, further comprising:
configuring said routing entity to have available cell identity.

4. The method according to claim 3, further comprising:
configuring said routing entity to have further available location area information.

5. The method according to claim 1, further comprising:
determining said location information by mapping the available information at said routing entity to known location information of access nodes of said network.

6. The method according to claim 1, further comprising:
returning said determined location information to the application that issued the request for location information.

7. The method according to claim 2, wherein
said inquired parameters comprise a service area identifier in third generation systems.

8. A location determination functional entity, comprising:
collecting means for collecting information to determine a location of a terminal attached to a communication network responsive to a request for location information about the location of the terminal issued by an application requiring the location information to said communication network and forwarded within said network to a routing entity currently in charge of routing messages for said terminal;
receiving means for receiving a response from said access control entity, the response being responsive to an inquiry to said access control entity for parameters for location determination by calculation of the location using the inquired parameters;
judging means for judging whether the response contains said inquired parameters;
requesting means configured to ask, responsive to a judgment of the judging means that the response does not contain said inquired parameters, said routing entity to provide information available at said routing entity for determination of the location of the terminal by mapping the provided available information to coordinate information;
wherein the mapping of the provided available information of the coordinate information comprises comparing the provided available information with information on antenna locations kept in a network management/planning system and
determining means configured to determine location information on the location of said terminal based on the collected information,
wherein the location of the terminal is determined with higher accuracy when the inquired parameters are received as compared to the location not being determined based on the inquired parameters, and
wherein the location determination functional entity is configured to obtain the location information.

9. The entity according to claim 8, wherein said inquired parameters comprise cell identity, timing advance, and power level information.

10. The entity according to claim 8, wherein information available at said routing entity is cell identity.

11. The entity according to claim 10, wherein information available at said routing entity further comprises location area information.

12. The entity according to claim 8, wherein said determining means is configured to determine location information by mapping available information at said routing entity to known location information of access nodes of said network.

13. The entity according to claim 8, further comprising:
a transmitting means for returning said determined location information to the application that issued the request for location information.

14. The entity according to claim 9, wherein said inquired parameters comprise a service area identifier in third generation systems.

15. A location determination functional entity, comprising:
- a collector configured to collect information to determine a location of a terminal attached to a communication network responsive to a request for location information about the location of the terminal issued by an application requiring the location information to said communication network and forwarded within said network to a routing entity currently in charge of routing messages for said terminal;
- a receiver configured to receive a response from said access control entity, the response being responsive to an inquiry to said access control entity for parameters for location determination by calculation of the location using the inquired parameters;
- a judger configured to judge whether the response contains said inquired parameters;
- a requester configured to ask, responsive to a judgment of the judger that the response does not contain said inquired parameters, said routing entity to provide information available at said routing entity to determine the location of the terminal by mapping the provided available information to coordinate information;
- wherein the mapping of the provided available information of the coordinate information comprises comparing the provided available information with information on antenna locations kept in a network management/planning system and
- a determiner configured to determine location information on the location of said terminal based on the collected information,
- wherein the location of the terminal is determined with higher accuracy when the inquired parameters are received as compared to the location not being determined based on the inquired parameters, and
- wherein said entity is configured to obtain the location information.

16. The entity according to claim 15, wherein said inquired parameters comprise cell identity, timing advance, and power level information.

17. The entity according to claim 15, wherein information available at said routing entity is cell identity.

18. The entity according to claim 17, wherein information available at said routing entity further comprises location area information.

19. The entity according to claim 15, wherein said collector is configured to determine location information by mapping available information at said routing entity to known location information of access nodes of said network.

20. The entity according to claim 15, further comprising:
- a transmitting unit configured to return said determined location information to the application that issued the request for location information.

21. The entity according to claim 16, wherein said inquired parameters comprise a service area identifier in third generation systems.

* * * * *